US010718919B2

(12) United States Patent
Courchaine et al.

(10) Patent No.: US 10,718,919 B2
(45) Date of Patent: *Jul. 21, 2020

(54) FIELD-INSTALLABLE OPTICAL MODULE WITH CONFIGURABLE CABLE ATTACHMENT AND INTERNAL CABLE MANAGEMENT FEATURES

(71) Applicant: AFL Telecommunications LLC, Duncan, SC (US)

(72) Inventors: Wilfred J. Courchaine, Moore, SC (US); Steve Polidan, Simpsonville, SC (US); Phillip Turner, Greenville, SC (US); Matthew Johnston, Simpsonville, SC (US); Roger Vaughn, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,995

(22) Filed: Aug. 13, 2018

(65) Prior Publication Data

US 2019/0004267 A1 Jan. 3, 2019

Related U.S. Application Data

(63) Continuation-in-part of application No. 14/430,645, filed as application No. PCT/US2013/062631 on Sep. 30, 2013, now Pat. No. 10,048,460.
(Continued)

(51) Int. Cl.
*G02B 6/00* (2006.01)
*G02B 6/255* (2006.01)
(Continued)

(52) U.S. Cl.
CPC .......... *G02B 6/4454* (2013.01); *G02B 6/3897* (2013.01)

(58) Field of Classification Search
CPC .. G02B 6/4452; G02B 6/3897; G02B 6/4455; G02B 6/4446; G02B 6/4453; G02B 6/4454; G02B 6/444
(Continued)

(56) References Cited

U.S. PATENT DOCUMENTS

| 5,870,519 A | 2/1999 | Jenkins et al. |
| 5,911,027 A | 6/1999 | Macken et al. |

(Continued)

FOREIGN PATENT DOCUMENTS

| WO | WO2009/045396 A2 | 4/2009 |
| WO | WO2012/114081 A2 | 8/2012 |

OTHER PUBLICATIONS

AFL Telecommunications LLC; European Application No. 13841228.3; Supplementary European Search Report; dated Mar. 17, 2016; (2 pages).

*Primary Examiner* — Kaveh C Kianni
*Assistant Examiner* — Hung Q Lam
(74) *Attorney, Agent, or Firm* — Dority & Manning, P.A.

(57) ABSTRACT

A cable adapter module includes a cable tray that holds a plurality of cables and an adapter tray removably attached to the cable tray. The adapter tray includes a plurality of adapters configured to connect the plurality of cables. The cable adapter module may also include a plurality of cable clips configured to secure the plurality of cables to the cable tray. The cable tray of the cable adapter module may also include a plurality of steps configured to hold the plurality of cables. The cable tray of the cable adapter module may also include a plurality of splice slots extending from the base wall towards the top of the cable tray, and at least one
(Continued)

splice holder removably attached to the plurality of splice slots.

17 Claims, 13 Drawing Sheets

Related U.S. Application Data

(60) Provisional application No. 61/762,488, filed on Feb. 8, 2013, provisional application No. 61/707,643, filed on Sep. 28, 2012.

(51) Int. Cl.
*G02B 6/44* (2006.01)
*G02B 6/38* (2006.01)

(58) Field of Classification Search
USPC .................................... 385/95, 99, 134–137
See application file for complete search history.

(56) References Cited

U.S. PATENT DOCUMENTS

| | | |
|---|---|---|
| 2006/0067636 A1 | 3/2006 | Bludau |
| 2008/0175554 A1 | 7/2008 | Coburn |
| 2009/0097813 A1 | 4/2009 | Hill |
| 2009/0290844 A1* | 11/2009 | Mullaney ............. G02B 6/4446 385/135 |
| 2010/0142910 A1 | 6/2010 | Hill et al. |
| 2010/0329620 A1 | 12/2010 | Griffiths et al. |
| 2011/0317974 A1 | 12/2011 | Krampotich |
| 2012/0134639 A1 | 5/2012 | Giraud |

* cited by examiner

FIG. 2
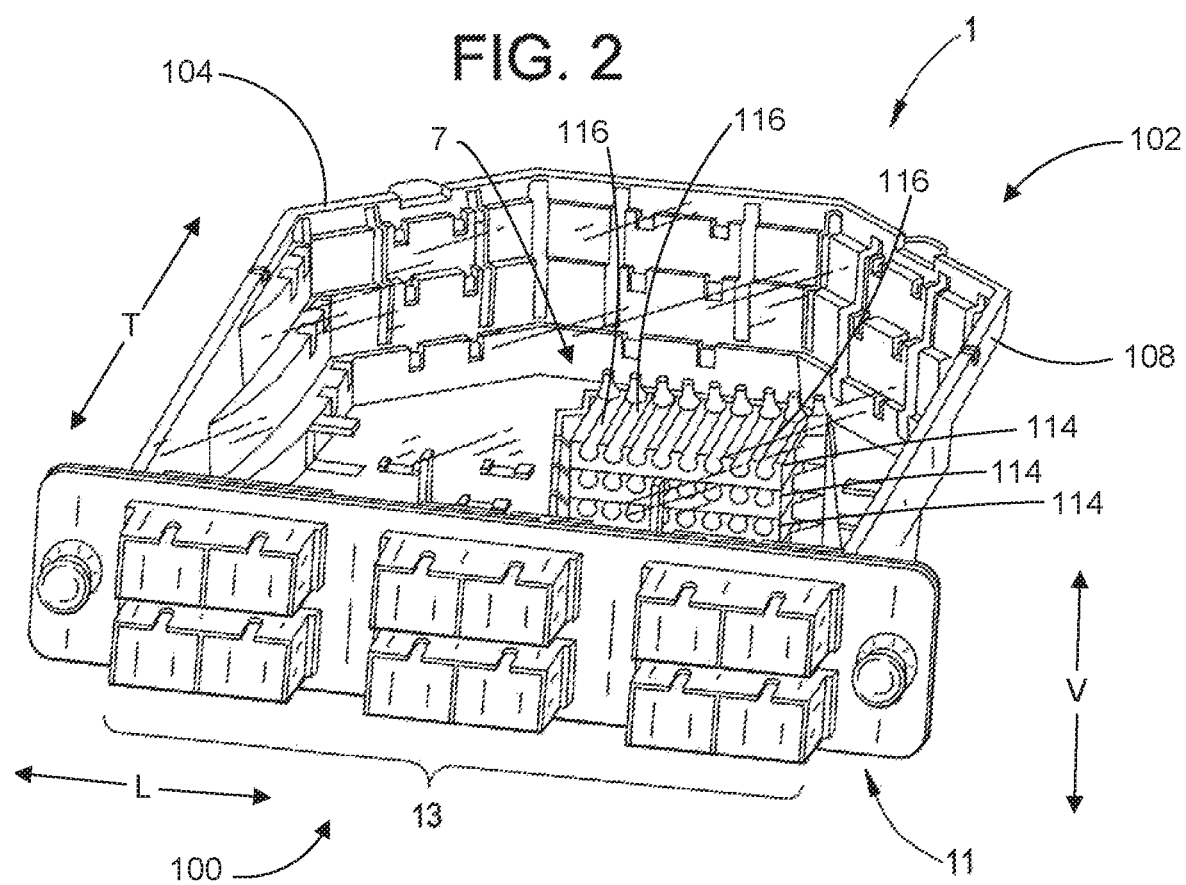
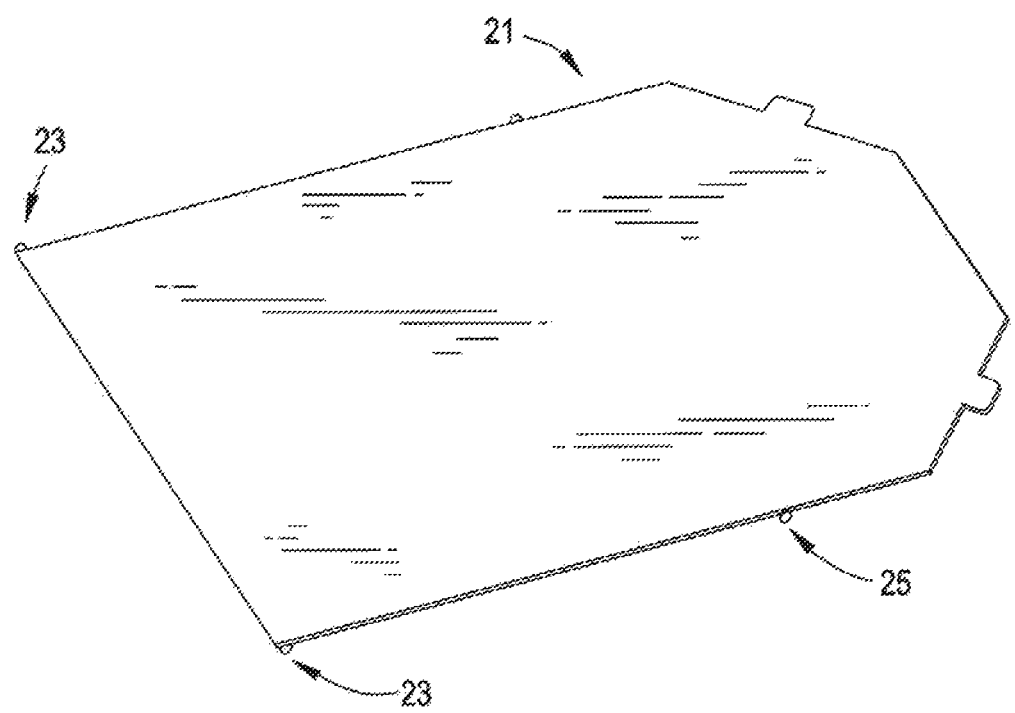

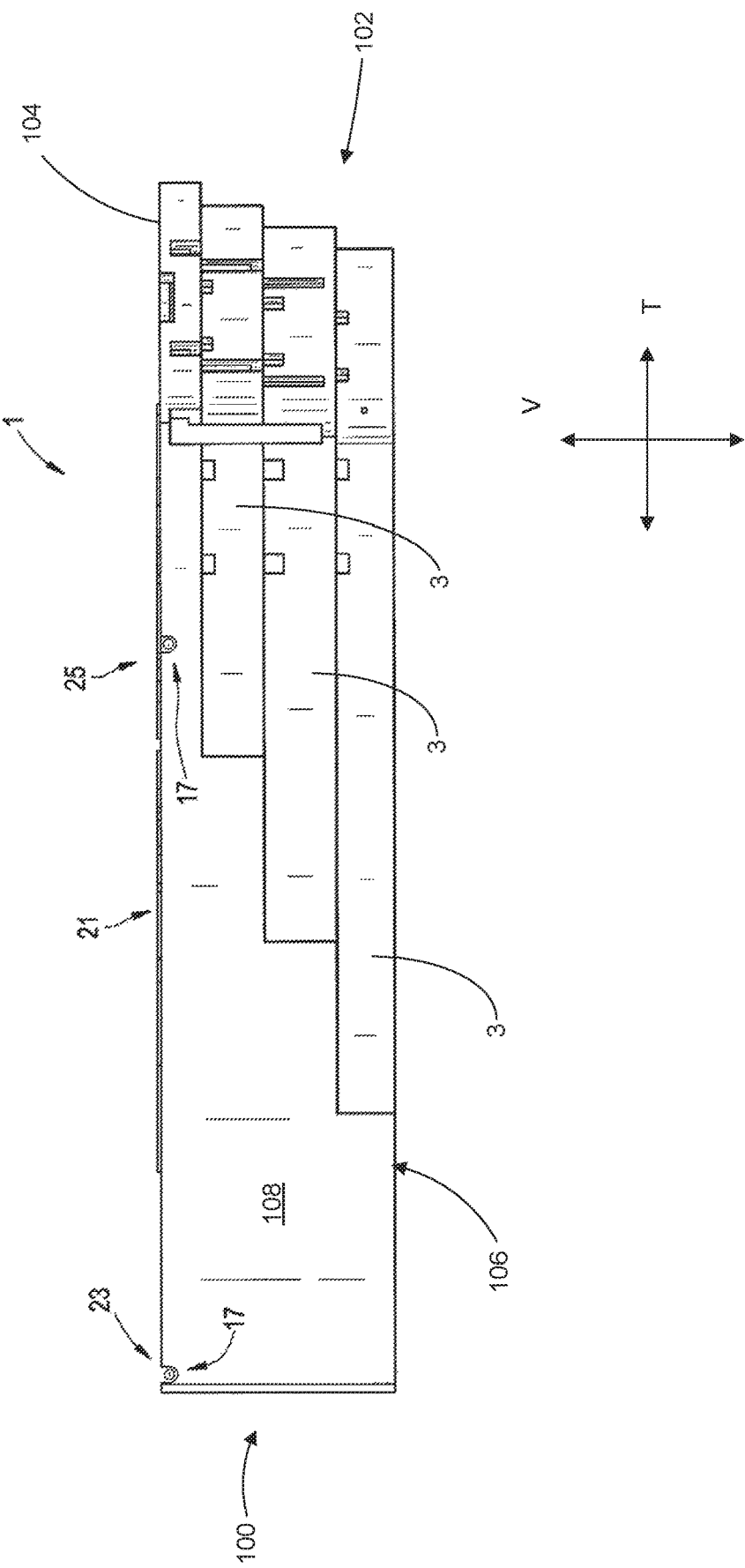

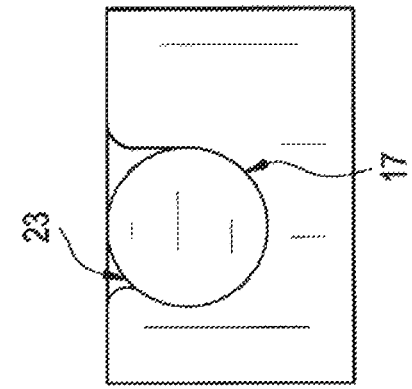
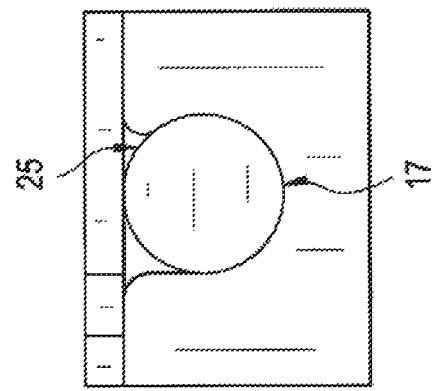
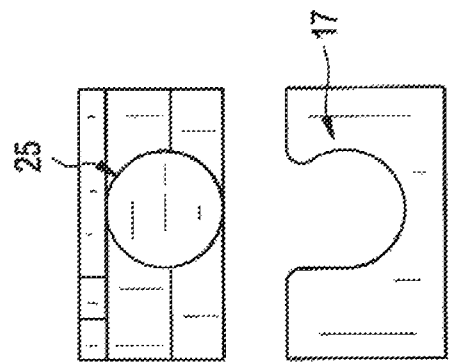

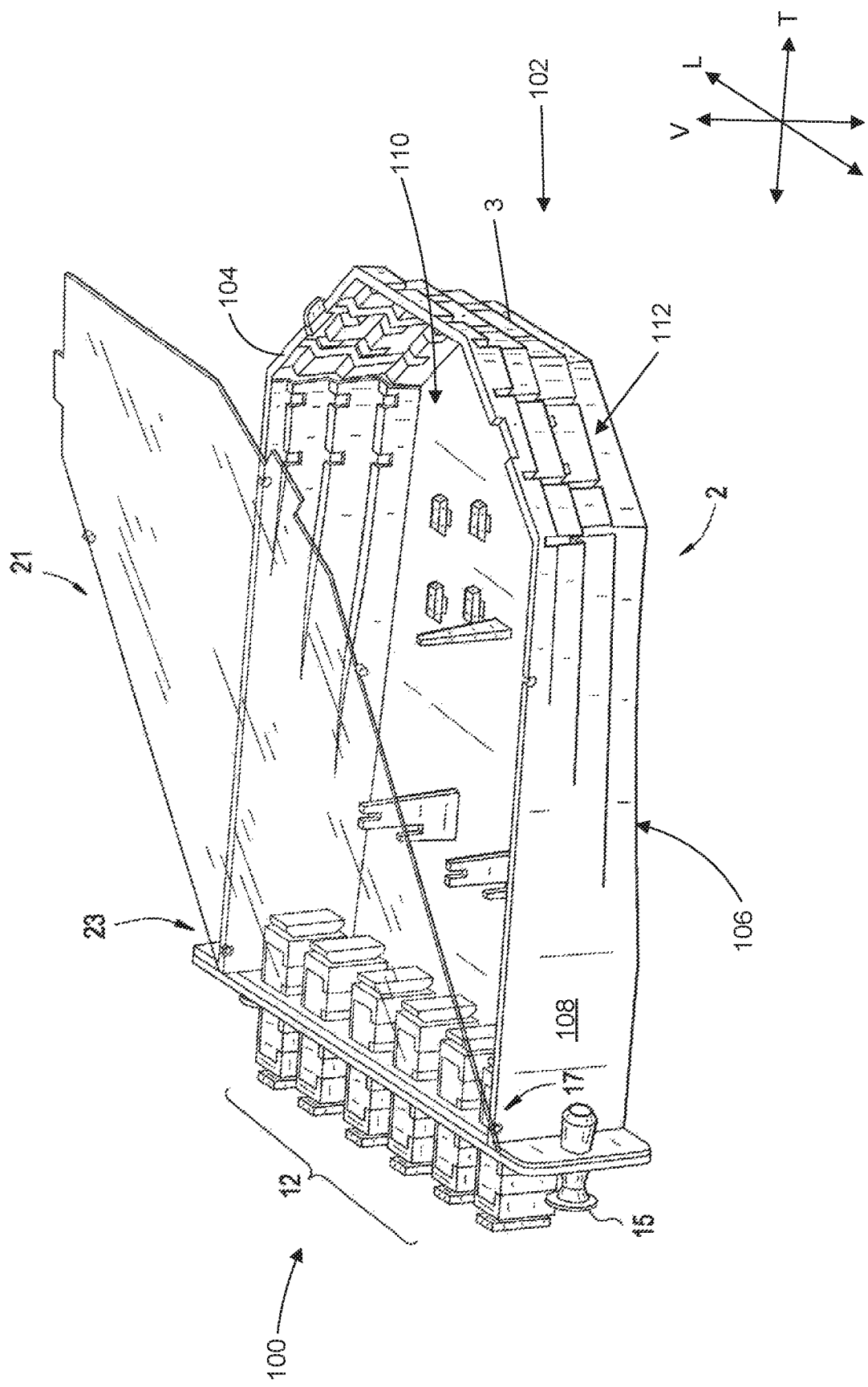

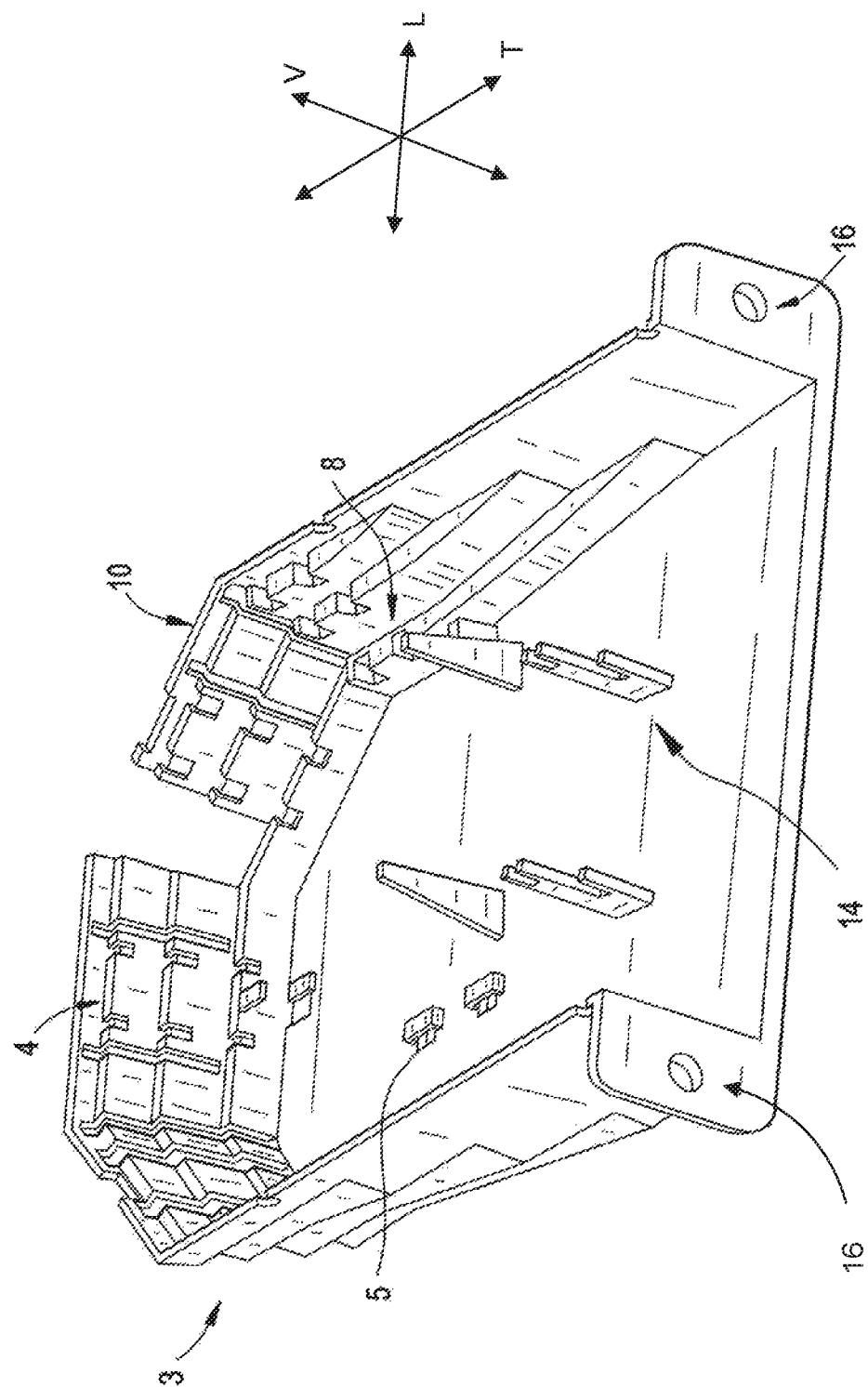

FIG. 10
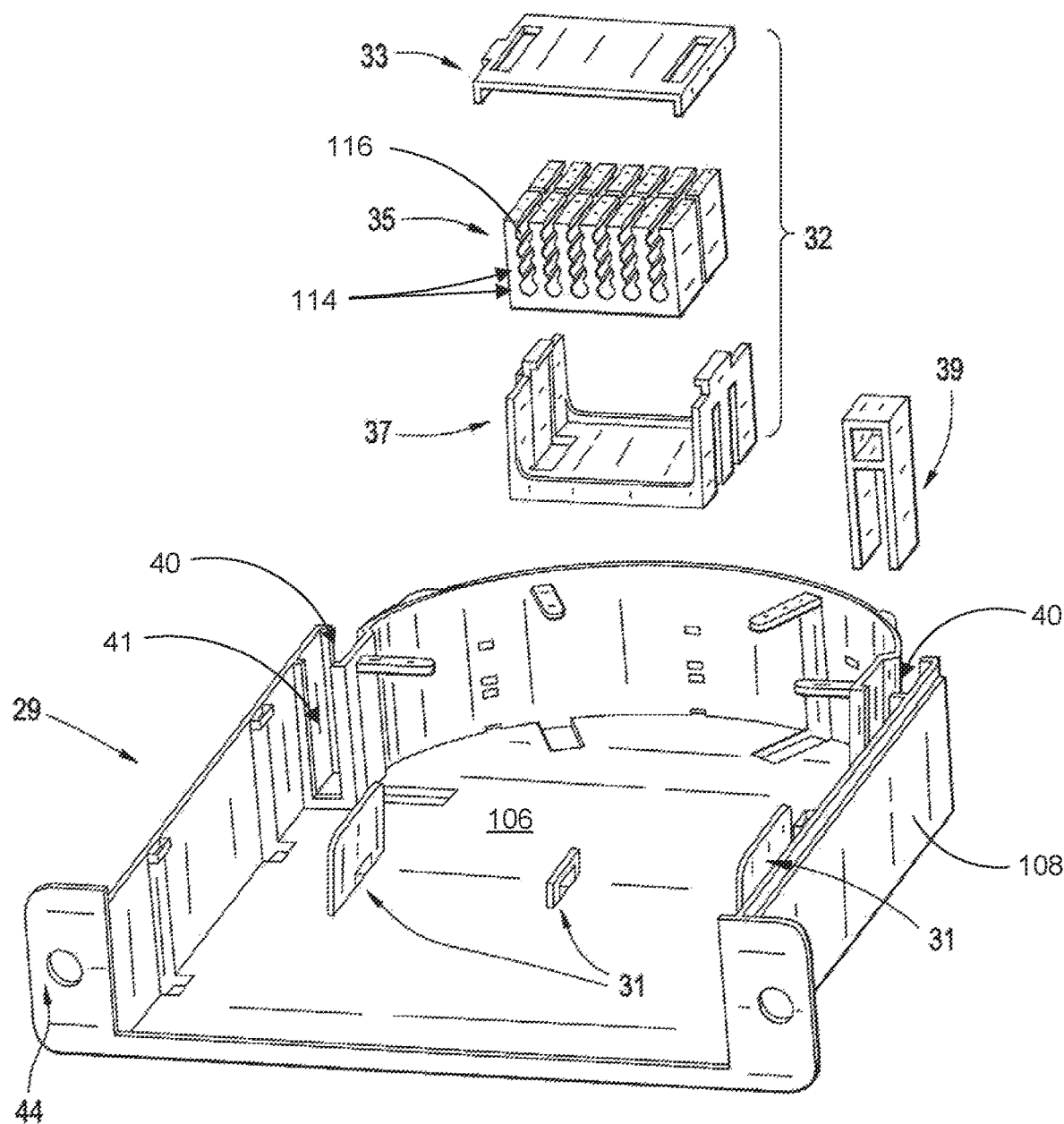
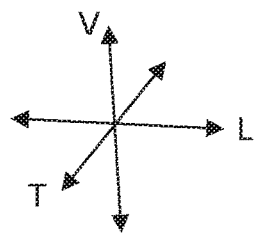

FIELD-INSTALLABLE OPTICAL MODULE WITH CONFIGURABLE CABLE ATTACHMENT AND INTERNAL CABLE MANAGEMENT FEATURES

CROSS-REFERENCE TO RELATED APPLICATIONS

This application is a continuation-in-part of U.S. patent application Ser. No. 14/430,645, filed on Mar. 24, 2015, which is a National Stage Patent Application of PCT/US2013/062631, filed on Sep. 30, 2013, which claims the benefit of priority to U.S. Provisional Patent Application No. 61/762,488, filed on Feb. 8, 2013 and U.S. Provisional Patent Application No. 61/707,643, filed on Sep. 28, 2012, the disclosures of all of which are incorporated by reference herein in their entireties.

FIELD OF THE INVENTION

The present subject matter relates generally to a cable adapter module, and more particularly to a cable adapter module for sorting cables.

BACKGROUND OF THE INVENTION

Existing patch and splice cassette modules are not space-efficient. Most offerings on the market do not conform to the standard LGX118 footprint. The most popular offerings utilize multi-component assemblies which can be cumbersome from a fiber management standpoint. Existing technology uses moving parts which can place the fiber at risk for damage. Current offerings require tie-wraps to secure incoming cable. This approach is very time consuming and requires multiple consumable items.

Current patch and splice modules offer one of two options, either a stationary splice sleeve holder that cannot be removed from the module or an open splice sleeve holder that can be removed from the module. The former option makes installation very difficult because it is much easier to mount the splices into the splice sleeve holder when it is not inside of the module because there is not much hand room inside the module. The latter option can pose problems because splice sleeves can easily fall out of conventional splice sleeve holders. This is because such splice sleeve holders are made out of flimsy rubber that bends when being mounted into or removed from the patch and splice module. When this rubber bends the splice sleeves can easily pop out, which increases the time of installation and even can lead to fiber damage.

Other limitations of existing patch and splice cassette modules include limited cable entry/access, cables coming into the module can only enter in through certain directions/angles/entry ports, traditional patch and splice modules do not do a good job of managing ribbon fiber, and existing cassette modules only accept proprietary or custom sized adapter plates.

Accordingly, an improved cable adapter module is desirable. For example, a cable adapter module including one or more features to allow easy and efficient installation of cables into the module would be useful. As another example, a cable adapter module which is universal, e.g., can accept any standard adapter plate, would be useful.

BRIEF DESCRIPTION OF THE INVENTION

Aspects and advantages of the invention will be set forth in part in the following description, or may be apparent from the description, or may be learned through practice of the invention.

In a first exemplary embodiment, a cable adapter module is provided. The cable adapter module defines vertical direction, a lateral direction and a transverse direction. The vertical, lateral and transverse directions are mutually perpendicular. The cable adapter module includes a cable tray extending between a back of the cable adapter module and a front of the cable adapter module along the transverse direction. The cable tray is configured to hold a plurality of cables. The cable adapter module also includes an adapter tray removably attached to the cable tray at the front of the cable adapter module. The cable tray includes a base wall and a sidewall. The base wall is spaced from a top of the cable tray along the vertical direction. The cable adapter module also includes a plurality of cable clips configured to secure the plurality of cables to the cable tray. Each of the plurality of cable clips is removably insertable along the vertical direction into one of a plurality of channels defined in the cable tray. The adapter tray includes a plurality of adapters configured to connect the plurality of cables.

In another exemplary embodiment, a cable adapter module is provided. The cable adapter module defines vertical direction, a lateral direction and a transverse direction. The vertical, lateral and transverse directions are mutually perpendicular. The cable adapter module includes a cable tray extending between a back of the cable adapter module and a front of the cable adapter module along the transverse direction. The cable tray is configured to hold a plurality of cables. The cable adapter module also includes an adapter tray removably attached to the cable tray at the front of the cable adapter module. The cable tray includes a base wall and a sidewall. The base wall is spaced from a top of the cable tray along the vertical direction. The cable tray further includes a plurality of steps configured to hold the plurality of cables. The plurality of steps are formed by an exterior surface of the sidewall at the back of the cable adapter module such that the steps are on an exterior of the cable tray. The plurality of steps are spaced apart between the base wall and the top of the cable tray along the vertical direction. The adapter tray includes a plurality of adapters configured to connect the plurality of cables.

In yet another exemplary embodiment a cable adapter module is provided. The cable adapter module defines vertical direction, a lateral direction and a transverse direction. The vertical, lateral and transverse directions are mutually perpendicular. The cable adapter module includes a cable tray extending between a back of the cable adapter module and a front of the cable adapter module along the transverse direction. The cable tray is configured to hold a plurality of cables. The cable adapter module also includes an adapter tray removably attached to the cable tray at the front of the cable adapter module. The cable tray includes a base wall and a sidewall. The base wall is spaced from a top of the cable tray along the vertical direction. The cable tray further includes a plurality of splice slots extending from the base wall towards the top of the cable tray. At least one splice holder is removably attached to the plurality of splice slots. The adapter tray includes a plurality of adapters configured to connect the plurality of cables.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 2 provides a perspective view of the exemplary cable adapter module of FIG. 1 with a lid of the cable adapter module detached from a cable tray of the cable adapter module.

FIG. 4A provides a side view of the exemplary cable adapter module of FIG. 1.

FIG. 4B provides an enlarged view of a portion of FIG. 4A illustrating an exemplary hinge of the lid of the cable adapter module removably attached to a receiver of the cable tray of the cable adapter module.

FIG. 4C provides an enlarged view of a portion of FIG. 4A illustrating an exemplary tab of the lid of the cable adapter module removably attached to a receiver of the cable tray of the cable adapter module.

FIG. 4D provides an enlarged view of a portion of FIG. 4A illustrating an exemplary tab of the lid of the cable adapter module removed from a receiver of the cable tray of the cable adapter module.

FIG. 5 provides a perspective view of the cable adapter module of FIG. 1 with the lid thereof in a partially open position.

FIG. 6 provides a perspective view of the cable tray of the cable adapter module of FIG. 1.

FIG. 10 provides a perspective view of the cable adapter module of FIG. 8 including an exemplary cable clip and an exemplary splice holder thereof.

DETAILED DESCRIPTION

Figure 1:
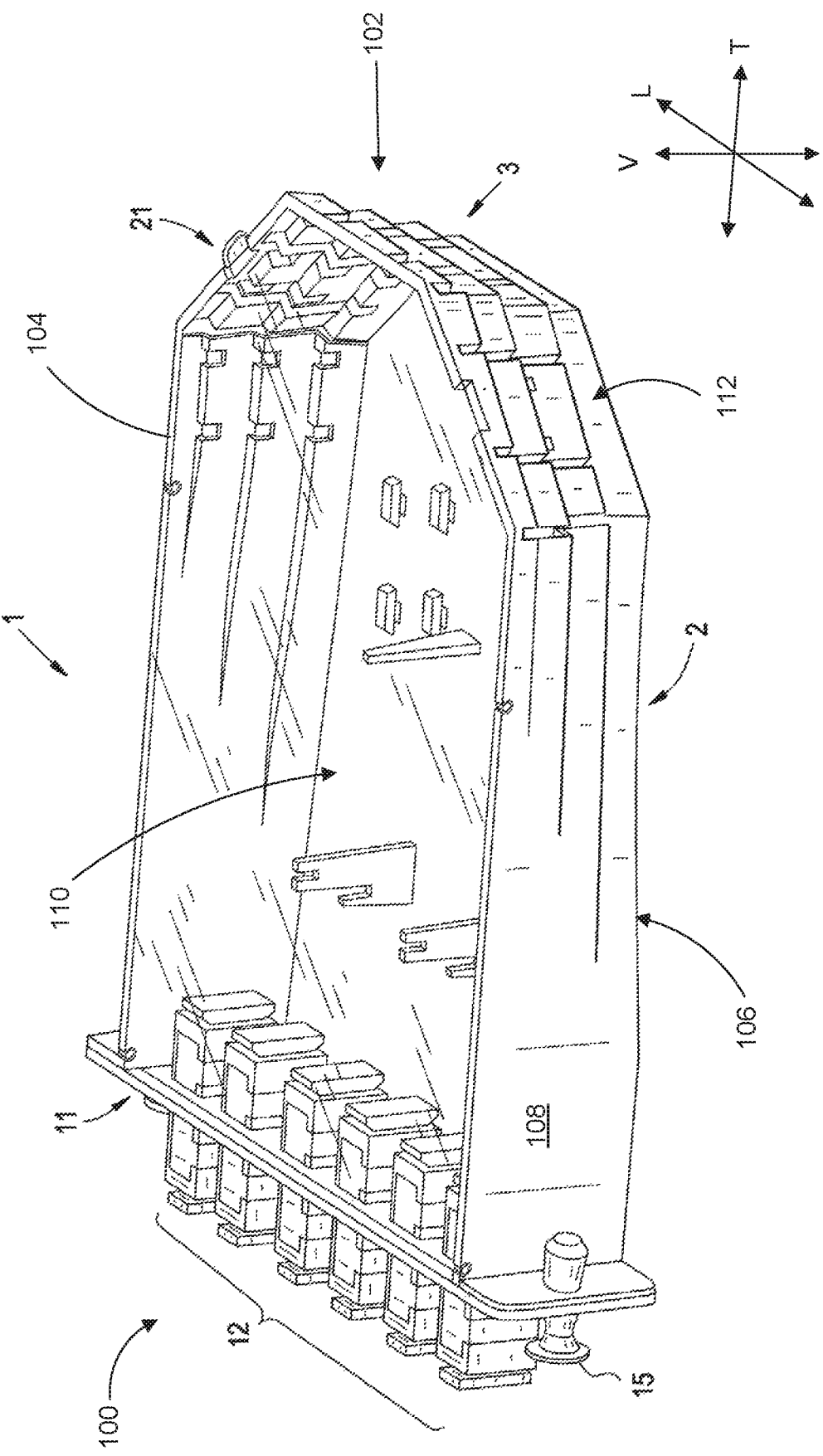
FIG. 1 provides a perspective view of a cable adapter module according to one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction.

The cable adapter module according to the present disclosure, in at least some embodiments, does not includes any moving parts within the cable tray. The cable adapter module may advantageously be constructed with a minimal number of required parts. For example, in some embodiments, the cable adapter module possesses four fundamental components to ensure simplicity: an adapter plate to assist with fiber optic interconnectivity, a body/lid to provide a protected environment for fiber optic components, a splice sleeve holder for the management and mounting of fiber optic splices, and a cable mounting clip for the time-efficient installation and mounting of fiber optic cable.

Referring to the drawings, FIG. 1 is a perspective view of an exemplary embodiment of a cable adapter module 1. As can be seen in FIG. 1, the cable adapter module 1 defines a lateral direction L, a transverse direction T, and a vertical direction V. The lateral direction L, the transverse direction T, and the vertical direction V are mutually perpendicular, such that an orthogonal coordinate system is defined. The cable adapter module 1 extends between a front 100 and a back 102 along the transverse direction T. The cable adapter module 1 includes a cable tray 2 for holding a plurality of cables, an adapter tray 11 which extends across the front 100 of the cable adapter module 1 along the lateral direction L, and a lid 21 which is removably, e.g., hingeably, attached to a top 104 of the cable tray 2.

As shown in FIG. 1, the cable tray 2 extends along the vertical direction V between a base wall 106 and the top 104 of the cable tray 2. A side wall 108 extends around the cable tray 2 and at least partially defines an interior 110 of the cable tray 2. The cable tray 2 has a plurality of steps 3 for holding a plurality of cables. In some embodiments, the plurality of steps 3 may extend along at least the back 102 of the cable adapter module 1, e.g., along the lateral direction L. The plurality of steps 3 may also extend at least partially from the back 102 to or towards the front 100, e.g., along the transverse direction T. The plurality of steps 3 are formed by an exterior surface of the sidewall 108 such that the steps 3 are on an exterior 112 of the cable tray 2. As may be seen, e.g., in FIG. 1, the plurality of steps 3 are spaced apart between the base wall 106 and the top 104 of the cable tray 2 along the vertical direction V.

Still referring to FIG. 1, the adapter tray 11 has a plurality of adapters 12 for connecting cables from inside the cable tray 2 to a set of cables outside of the cable tray 2. The adapter tray 11 is removably attached to the cable tray 2. In an exemplary embodiment, the cable tray may be attached by a screw 15. The cable adapter module 1 may be made of metal, plastic, or other similar materials, or combinations thereof, e.g., the adapter tray 11 may be comprised of metal in whole or in part, and the cable tray 2 may be comprised of plastic.

FIG. 2 is a perspective view of an exemplary embodiment of a cable adapter module 1 and a perspective view of an exemplary embodiment of a lid 21. The cable adapter tray 11 may have any variety of a plurality of adapters. In an exemplary embodiment, a plurality of adapters 13 is embedded in the adapter tray 11. The plurality of adapters 13 shown in FIG. 2 are different from the plurality of adapters 12 of FIG. 1. In one or more exemplary embodiments, the adapter tray 11 may be any adapter tray which meets industry standard LGX 118, e.g., a proprietary adapter panel or tray is not required. The lid 21 comprises a plurality of snaps 25, which are removably attached to the top 104 of the cable tray 2, and a plurality of hinges 23, which are removably attached and hingeably attached to the cable tray 2. In an exemplary embodiment, the tray 21 of FIG. 2 shows two hinges 23 and two snaps 25.

As may be seen in FIG. 2, a splice holder 7 is provided in the cable tray 2 for holding spliced cables. In the illustrated exemplary embodiment of FIG. 2, the splice holder 7 includes a plurality of rows 114, each of which has a plurality of divots 116 for receiving the spliced cables. In the example embodiment illustrated by FIG. 2, each row 114 is formed as a separate piece. As illustrated in FIG. 2, the plurality of rows 114 may be stacked on top of one another. For example the plurality of divots 116 of each row 114 may receive spliced cables, and once each divot 116 of a row 114 is occupied, then a subsequent row 114 may be stacked on. The splice holder 7 may be made of any suitable material, e.g., plastic.

Figure 3:
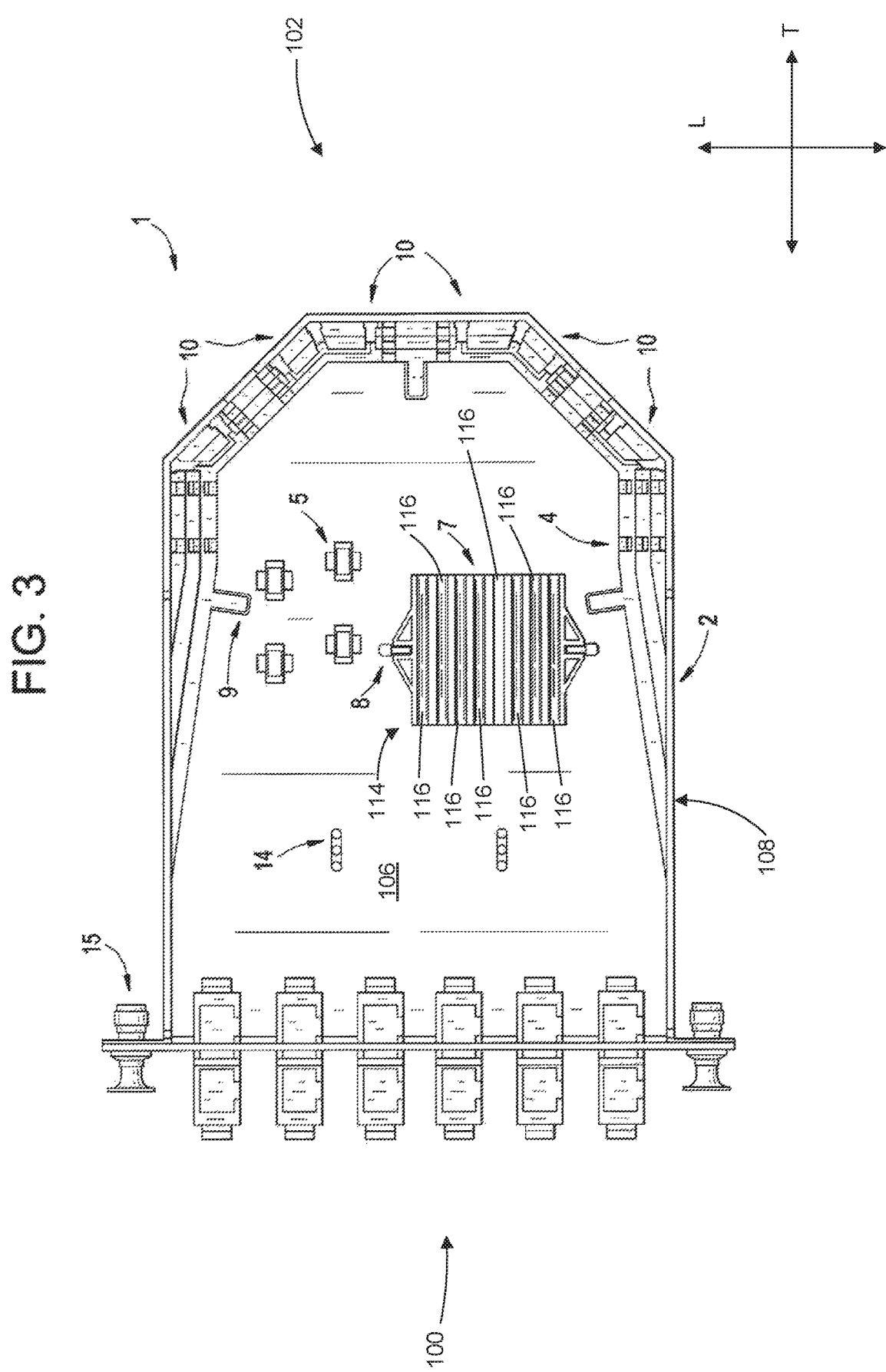
FIG. 3 provides an overhead view of the cable adapter module of FIG. 1.

FIG. 3 is an overhead view of an exemplary embodiment of a cable tray 2. As can be seen in FIG. 3, the cable tray 2 includes a plurality of bridges 5 for securing a plurality of cables and a plurality of splice slots 8 for holding the splice holder 7. The stacked rows 114 (FIG. 2, in the view of FIG. 3, only a single row 114, e.g., the top of the stack, is visible) of the splice holder 7 may fit into the plurality of splice holders 8 for securing the spliced cables. In the example embodiment illustrated by FIG. 3, each row 114 of the splice holder 7 includes eight divots 116. Also as may be seen in FIG. 3, the cable tray 2 may further include a plurality of hooks 9 to secure a plurality of cables, a plurality of breakout portions 10, and a plurality of towers 14 for sorting a plurality of cables. A selected one or more of the plurality of breakout portions 10 may be broken by an operator to allow for entry of a plurality of cables into the cable tray 2. A plurality of cables may enter from various positions into the cable tray 2 depending upon which one of the plurality of breakout portions is broken by an operator.

FIG. 4A is a side view of an exemplary embodiment of a cable adapter module 1 including a cable tray 2 and a lid 21. Both the plurality of snaps 25 and the plurality of hinges 23 of the lid 21 are removably attached to a plurality of receivers 17 in the cable tray 2. In an exemplary embodiment, the plurality of hinges are removably attached to the cable tray 2.

FIG. 4B is a close-up side view of an exemplary embodiment of a cable tray 2 with a hinge 23 removably attached to a receiver 17 of the cable tray 2.

FIG. 4C is a close-up side view of an exemplary embodiment of a cable tray 2 with a snap 25 removably attached to a receiver 17 of the cable tray 2.

FIG. 4D is a close-up side view of an exemplary embodiment of a cable tray 2 with a snap 25 removed from a receiver 17 of the cable tray 2.

FIG. 5 is a perspective view of an exemplary embodiment of a cable tray 2 with a lid 21 and an adapter plate 11. The lid 21 is shown to be hingeably attached by the plurality of hinges 23 to the plurality of receivers 17 of the cable tray 2. For example, the lid 21 is illustrated in an open position in FIG. 5. The snaps 25 are removed from the plurality of receivers 17.

FIG. 6 is a perspective view of an exemplary embodiment of a cable tray 2 wherein a lid 21 and an adapter plate 11 are not attached. In an exemplary embodiment, as shown in FIG. 6, one of the plurality of breakout portions 10 is removed. An adapter plate 11 may be attached to a plurality of adapter plate receivers 16 of the cable tray 2 which are spaced apart along the lateral direction L. In addition, the plurality of steps 3 of the cable tray 2 has a plurality of holes 4. In an exemplary embodiment, a plurality of cables may be attached to the plurality of steps 3 by using a zip-tie, which is fed through the plurality of holes 4, to wrap around the plurality of cables.

Figure 7:
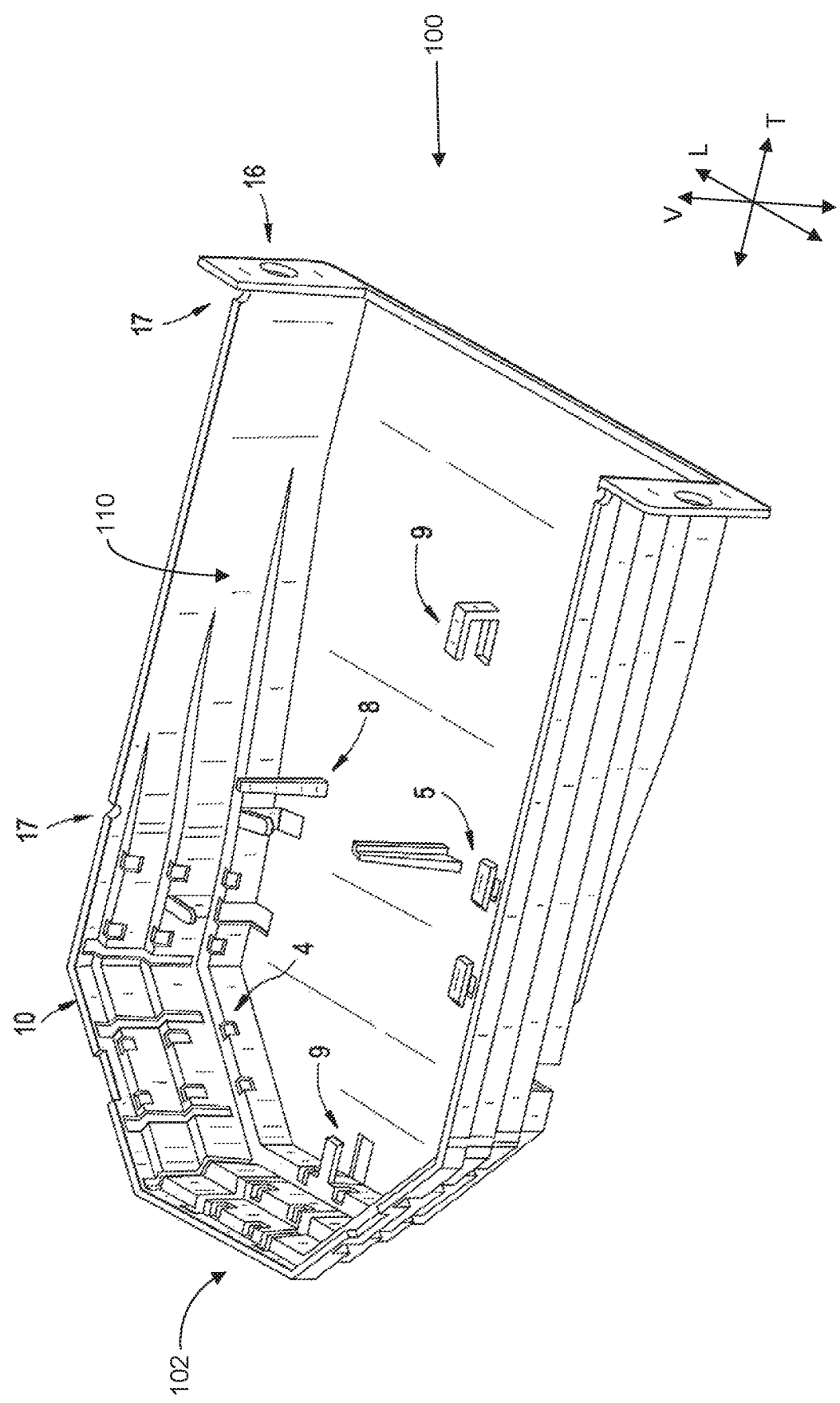
FIG. 7 provides a perspective view of the cable tray of the cable adapter module of FIG. 1.

FIG. 7 is a perspective view of an exemplary embodiment of a cable tray 2 wherein a lid 21 and an adapter plate 11 are not attached. In an exemplary embodiment, an additional hook 9 is formed in a position away from the plurality of steps 3 within the interior 110 of the cable tray 2.

Figure 8:
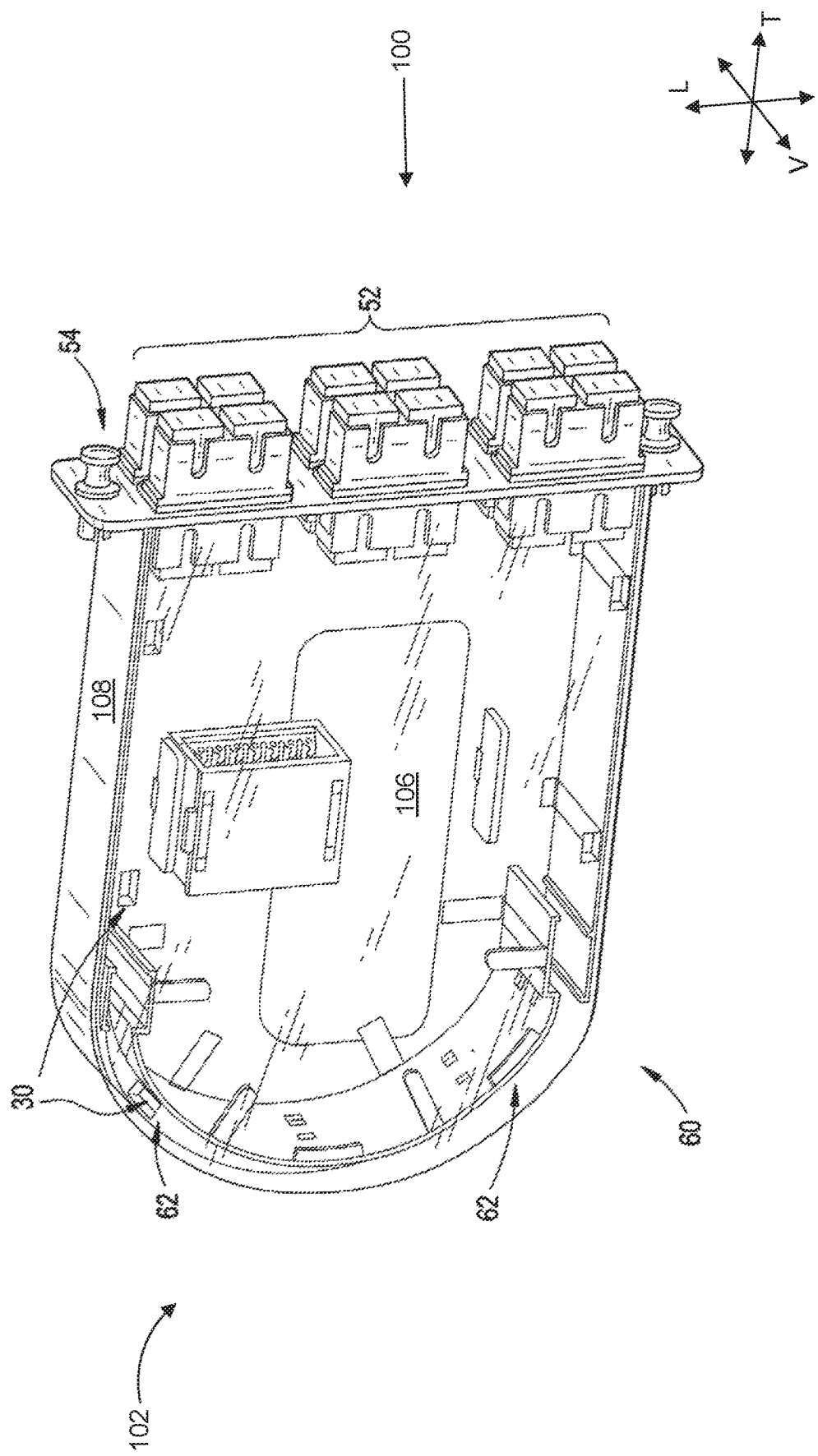
FIG. 8 provides a perspective view of a cable adapter module according to one or more additional exemplary embodiments of the present subject matter.

FIG. 8 is a perspective view of a second exemplary embodiment of a cable tray 29, wherein a lid 60 has receiving sections 62, and the cable tray 29 including protruding sections 30. In the exemplary embodiment of FIG. 8, the sidewall 108 of the cable tray 29 includes a semi-circular portion at the back 102 of the cable adapter module 1. In an exemplary embodiment, the protruding sections 30 of the cable tray 29 interact with the receiving sections 62 so that the lid 60 is removably attached to the cable tray 29. In an exemplary embodiment, the lid 60 may be removed by sliding the lid 60 away from the plurality of adapters 52.

Figure 9:
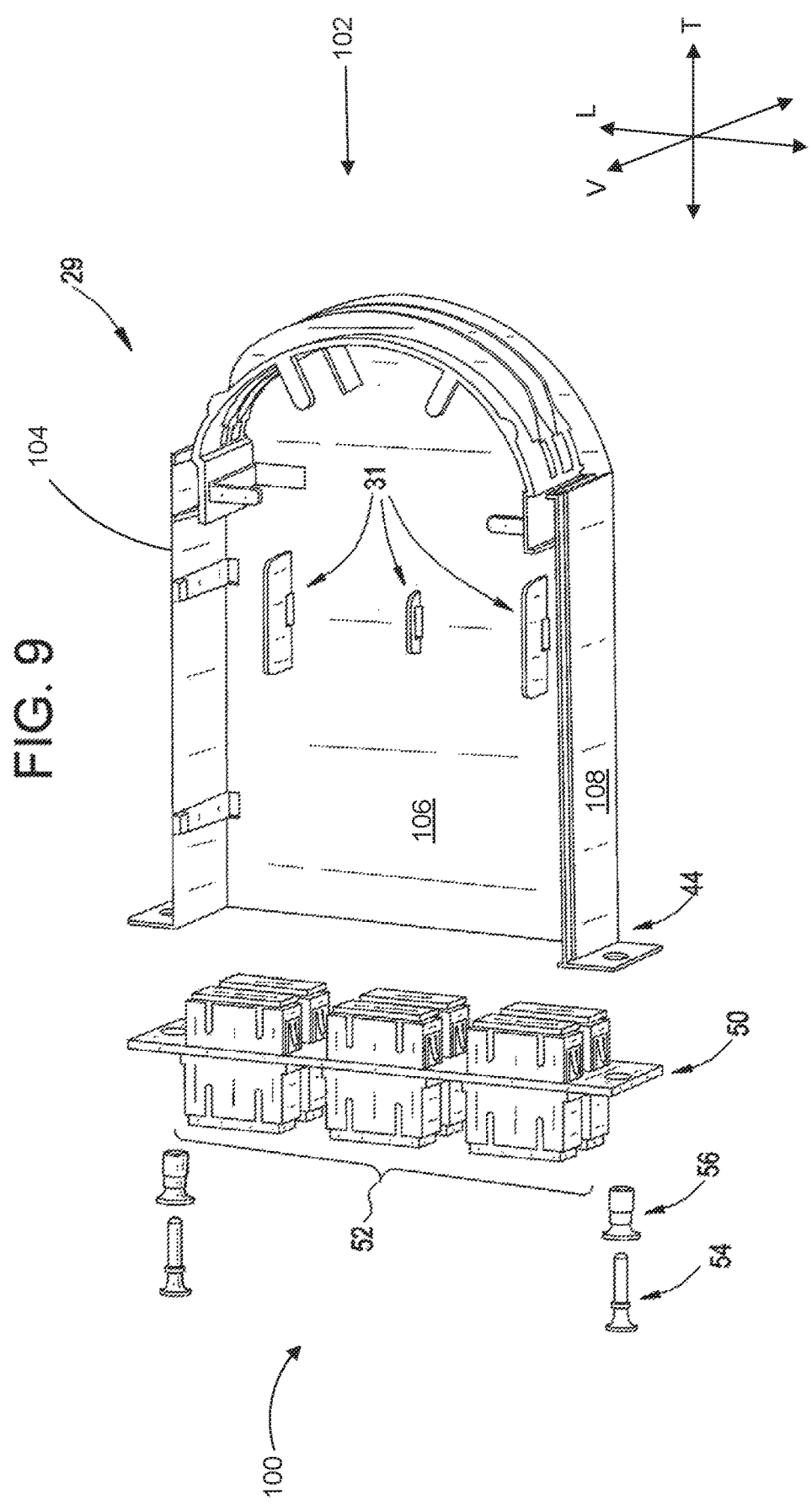
FIG. 9 provides a perspective view of the cable adapter module of FIG. 8 with an adapter plate detached from a cable tray.

FIG. 9 is a perspective view of a second exemplary embodiment of a cable tray 29 and an adapter tray 50 detached from the cable tray 29. In an exemplary embodiment, a plurality of screws 54 removably attach to a plurality of screw adapters 56 for removably attaching the adapter plate 50 to a plurality of screw receivers 44. A second exemplary embodiment of a plurality of splice slots 31 is provided in the cable tray 29. The splice slots 31 in FIG. 9 are configured for holding two splice holders 32.

FIG. 10 is a perspective view of a second exemplary embodiment of a cable tray 29 and a second exemplary embodiment of a splice holder 32 detached from the cable tray 29. In an exemplary embodiment, the splice holder 32 has a splice sorter 35 for holding and sorting cables which have been spliced, a splice holder adapter 37 for adapting the splice sorter 35 to be removably attached to the splice slots 31, and a splice cap 33 for protecting the wires in the splice sorter 35 and for covering the splice sorter 35. Similar to the splice holder 7 of FIGS. 2 and 3, the splice sorter 35 includes a plurality of divots 116 arranged in rows 114. In an exemplary embodiment, the splice sorter 35 of FIG. 10 is made of a one-piece construction, wherein the plurality of rows 114 are integrally joined in a unitary structure, as opposed to the plurality of separate rows 114 of the splice holder 7 of FIGS. 2 and 3. The splice sorter 35 may be made of any suitable material, e.g., plastic.

In an exemplary embodiment, as shown in FIG. 10, the splice sorter can hold up to 24 spliced wires, e.g., with four rows 114 each having six divots 116. In an exemplary embodiment, the splice holder 32 can hold both single fusion and ribbon splice sleeves. In an exemplary embodiment, the splice holder 32 provides a secure mounting area for splices (i.e. splices will not pop out). In an exemplary embodiment, the splice holder 32 is removable by a "snap-in/snap-out" feature. This feature makes installation easier since splice sleeves can be loaded into the splice sleeve holder outside of the patch and splice module.

In an exemplary embodiment, as shown in FIG. 10, the cable tray 29 has a cable clip 39 for holding cables. As may be seen in FIG. 10, each of the plurality of cable clips 39 is removably insertable along the vertical direction V into one of a plurality of channels 40 defined in the cable tray 29. In the exemplary embodiment illustrated in FIG. 10, the plurality of channels 40 extend along the vertical direction V the axis and an entry port 41 into the cable tray 29 is defined at each of the plurality of channels 40. As illustrated, each entry port 41 is oriented perpendicularly to the vertical direction V, e.g., along the transverse direction T.

Figure 11:
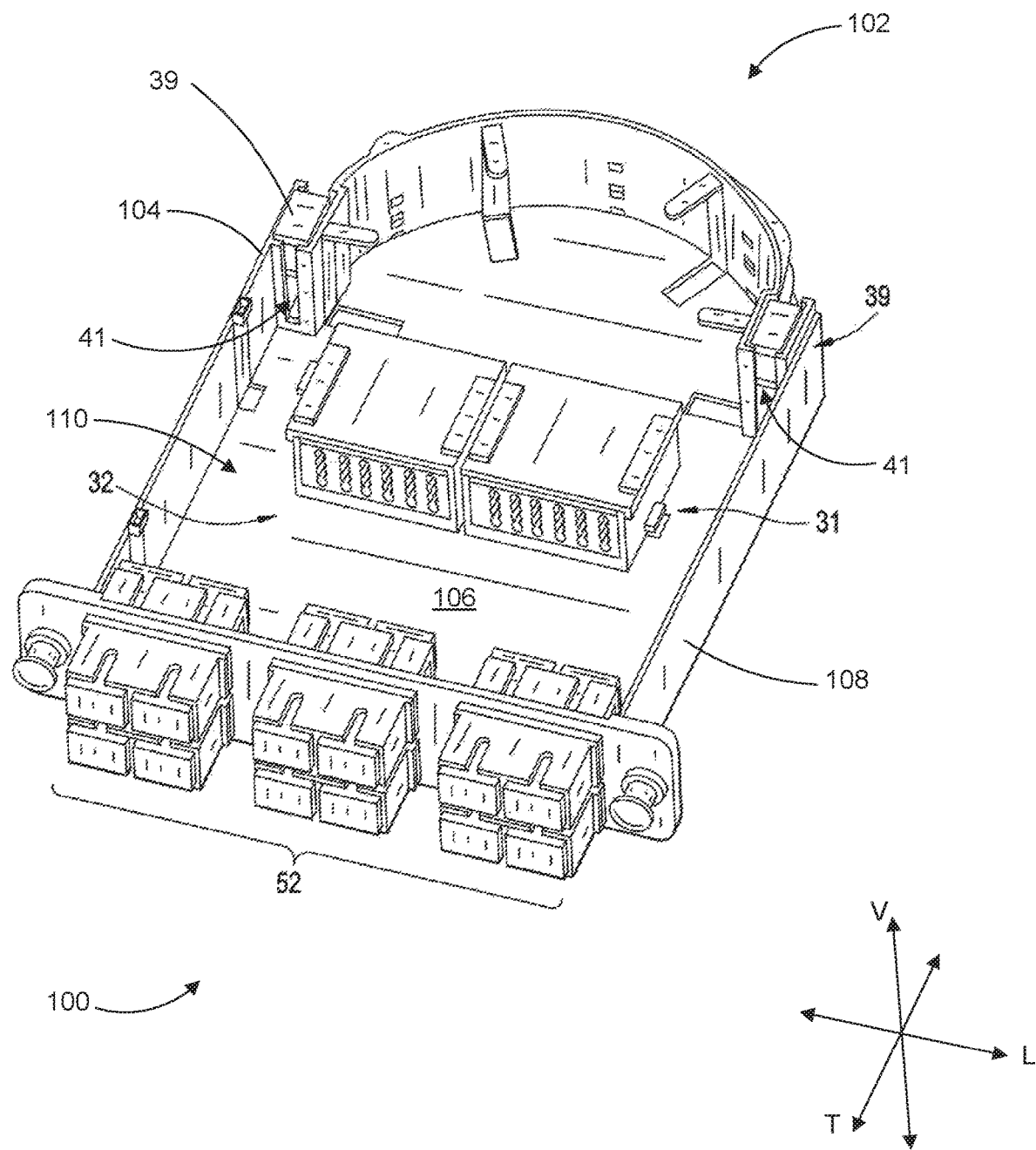
FIG. 11 a perspective view of the cable adapter module of FIG. 8 with an exemplary splice holder thereof in an assembled position.

FIG. 11 is a perspective view of a second exemplary embodiment of a cable tray 29 wherein a plurality of splice holders 32 and a plurality of cable clips 39 interact with the cable tray 29. In an exemplary embodiment, two splice holders 32 are shown to be removably attached to the splice slots 31. In an exemplary embodiment, the cable clips 39 are shown to be removably attached to the cable tray 29. In an exemplary embodiment, the cable clips 39 secure a plurality of cables which enter or exit the cable tray 29, e.g., at the entry ports 41 in the corresponding channels 40. In an exemplary embodiment, the cable tray 29 allows a plurality of cables to enter into the back 102 of the cable adapter module 1 across a 180 degree sweep. In a more specific exemplary embodiment, a portion of the cable tray 29, e.g., a portion of the sidewall 108 of the cable tray 29, at the back 102 of the cable adapter module 1 consists of a tiered semicircular geometry that allows fiber optic cables to enter into two, separate entry ports 41.

Figure 12:
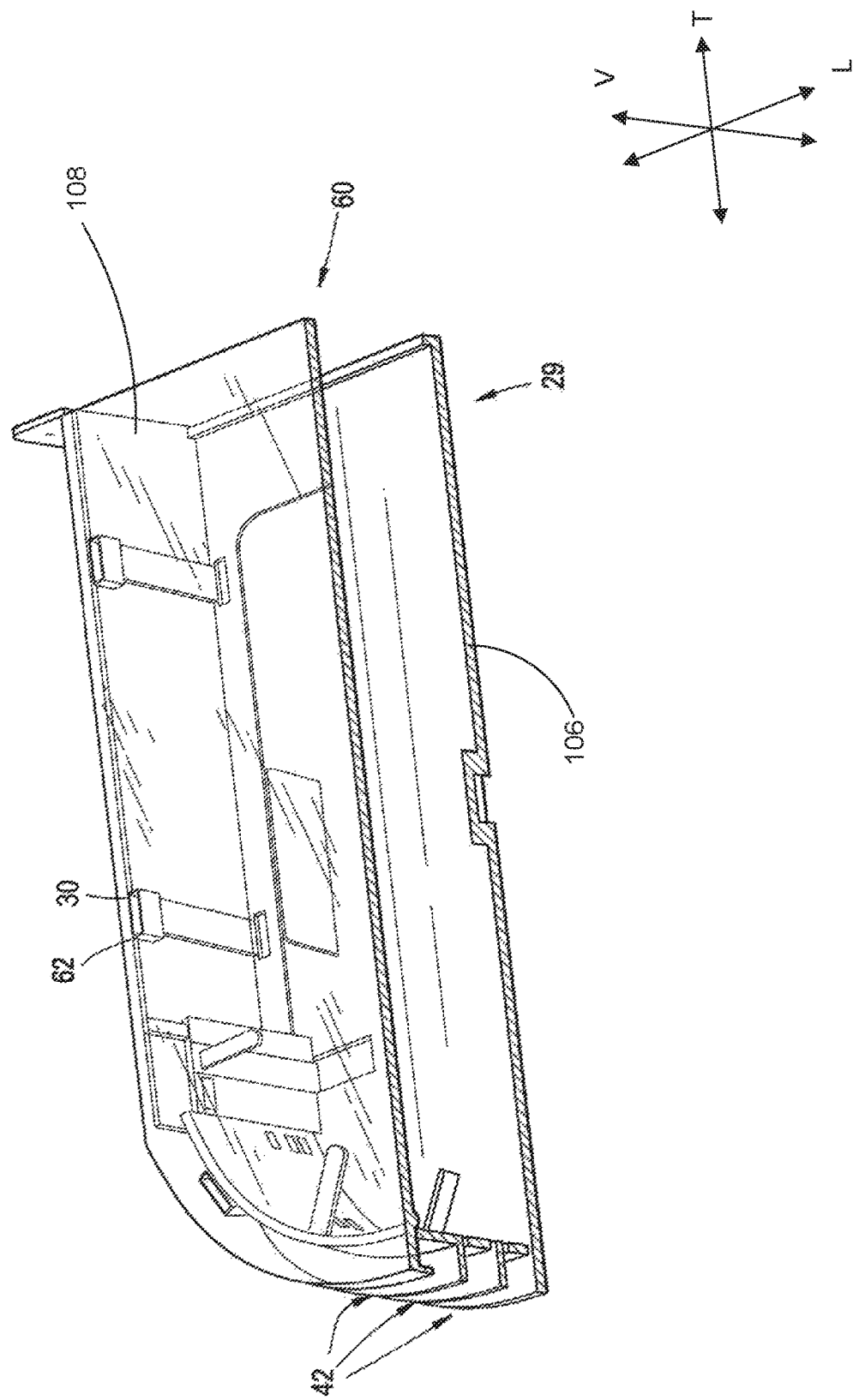
FIG. 12 provides a sectional perspective view of an exemplary cable tray and lid of the cable adapter module of FIG. 8.

FIG. 12 is a perspective section view of a second exemplary embodiment of a cable tray 29 with a lid 60 removably attached to the cable tray 29. In an exemplary embodiment, the cable tray 29 has a plurality of steps 42 for securing a plurality of cables. In an exemplary embodiment, once the cable clips 39 have secured the plurality of cables, the cables exit the cable tray 29 and are secured on the plurality of steps 42 in a direction of the plurality of steps 42, e.g., along a curvature of the semicircular portion of the sidewall 108 in a lateral-transverse plane, i.e., a plane defined by the lateral direction L and the transverse direction T. An exemplary embodiment of the design of the cable clips 39 provides adequate pull tension while minimizing the time of installation. In an exemplary embodiment, the clips 39 can be manufactured from semi-rigid plastic or rubber type materials to provide adequate amount of grip to the various types of tubing materials used to house the plurality of cables. An exemplary embodiment of the invention utilizes a lid 60 that slides and snaps into place maintaining the compression of the clips 39 and maintaining integrity. In an exemplary embodiment, the lid 60 can optionally be hinged to provide access without removal of the lid 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cable adapter module defining a vertical direction, a lateral direction and a transverse direction, the vertical, lateral and transverse directions being mutually perpendicular, the cable adapter module comprising:
    a cable tray extending between a back of the cable adapter module and a front of the cable adapter module along the transverse direction, the cable tray configured to hold a plurality of cables; and
    an adapter tray removably attached to the cable tray at the front of the cable adapter module;
    wherein the cable tray comprises:
        a base wall and a sidewall, the base wall spaced from a top of the cable tray along the vertical direction; and
        a plurality of steps configured to hold the plurality of cables, the plurality of steps formed by an exterior surface of the sidewall at the back of the cable adapter module such that the steps are on an exterior of the cable tray and spaced apart between the base wall and the top of the cable tray along the vertical direction;
    wherein the cable adapter module further comprises a plurality of cable clips configured to secure the plurality of cables to the cable tray, each of the plurality of cable clips removably insertable along the vertical direction into one of a plurality of channels defined in the cable tray; and
    wherein the adapter tray comprises a plurality of adapters configured to connect the plurality of cables.

2. The cable adapter module of claim 1, wherein the plurality of channels extend along the vertical direction, and wherein an entry port into the cable tray is defined at each of the plurality of channels, each entry port oriented along the transverse direction.

3. The cable adapter module of claim 1, wherein the cable tray further comprises a plurality of splice slots extending from the base wall towards the top of the cable tray, and at least one splice holder removably attached to the plurality of splice slots.

4. The cable adapter module of claim 3, wherein the at least one splice holder comprises a plurality of rows and a plurality of divots defined in each of the plurality of rows, each divot configured to hold one of the spliced cables.

5. The cable adapter module of claim 3, wherein the at least one splice holder further comprises a splice holder adapter directly removably attached to the splice slots and a splice cap configured to cover the splice holder and configured to retain the spliced cables in the splice holder.

6. A cable adapter module defining a vertical direction, a lateral direction and a transverse direction, the vertical, lateral and transverse directions being mutually perpendicular, the cable adapter module comprising:
    a cable tray extending between a back of the cable adapter module and a front of the cable adapter module along the transverse direction, the cable tray configured to hold a plurality of cables; and
    an adapter tray removably attached to the cable tray at the front of the cable adapter module;
    wherein the cable tray comprises a base wall and a sidewall, the base wall spaced from a top of the cable tray along the vertical direction, and wherein the cable tray further comprises a plurality of steps configured to hold the plurality of cables, the plurality of steps formed by an exterior surface of the sidewall at the back of the cable adapter module such that the steps are on an exterior of the cable tray and spaced apart between the base wall and the top of the cable tray along the vertical direction; and
    wherein the adapter tray comprises a plurality of adapters configured to connect the plurality of cables.

7. The cable adapter module of claim 6, further comprising a plurality of cable clips configured to secure the plurality of cables to the cable tray.

8. The cable adapter module of claim 7, wherein each of the plurality of cable clips is removably insertable in the vertical direction into one of a plurality of channels defined in the cable tray, the plurality of channels extending in the vertical direction.

9. The cable adapter module of claim 8, wherein an entry port into the cable tray is defined at each of the plurality of channels, each entry port oriented along the transverse direction.

10. The cable adapter module of claim 6, wherein the cable tray further comprises a plurality of splice slots extending from the base wall towards the top of the cable tray, and at least one splice holder removably attached to the plurality of splice slots.

11. The cable adapter module of claim 10, wherein the at least one splice holder comprises a plurality of rows and a plurality of divots defined in each of the plurality of rows, each divot configured to hold one of the spliced cables.

12. The cable adapter module of claim 10, wherein the at least one splice holder further comprises a splice holder adapter directly removably attached to the splice slots and a splice cap configured to cover the splice holder and configured to retain the spliced cables in the splice holder.

13. A cable adapter module defining a vertical direction, a lateral direction and a transverse direction, the vertical, lateral and transverse directions being mutually perpendicular, the cable adapter module comprising:
   a cable tray extending between a back of the cable adapter module and a front of the cable adapter module along the transverse direction, the cable tray configured to hold a plurality of cables; and
   an adapter tray removably attached to the cable tray at the front of the cable adapter module;
   wherein the cable tray comprises;
      a base wall and a sidewall, the base wall spaced from a top of the cable tray along the vertical direction;
      a plurality of splice slots extending from the base wall towards the top of the cable tray;
      a splice holder removably attached to the plurality of splice slots, the splice holder comprising a plurality of rows and a plurality of divots defined in each of the plurality of rows, each divot configured to hold one of the spliced cables; and
      a plurality of steps configured to hold the plurality of cables, the plurality of steps formed by an exterior surface of the sidewall at the back of the cable adapter module such that the steps are on an exterior of the cable tray and spaced apart between the base wall and the top of the cable tray along the vertical direction;
   wherein the adapter tray comprises a plurality of adapters configured to connect the plurality of cables.

14. The cable adapter module of claim 13, wherein the splice holder further comprises a splice holder adapter directly removably attached to the splice slots and a splice cap configured to cover the splice holder and configured to retain the spliced cables in the splice holder.

15. The cable adapter module of claim 13, further comprising a plurality of cable clips configured to secure the plurality of cables to the cable tray.

16. The cable adapter module of claim 15, wherein each of the plurality of cable clips is removably insertable in the vertical direction into one of a plurality of channels defined in the cable tray, the plurality of channels extending in the vertical direction.

17. The cable adapter module of claim 16, wherein an entry port into the cable tray is defined at each of the plurality of channels, each entry port oriented along the transverse direction.

* * * * *